United States Patent
Liang et al.

(10) Patent No.: US 8,374,000 B2
(45) Date of Patent: Feb. 12, 2013

(54) INTERLEAVED FLYBACK CONVERTER DEVICE WITH LEAKAGE ENERGY RECYCLING

(75) Inventors: Tsorng-Juu Liang, Tainan (TW);
Wen-Yu Huang, Tainan (TW);
Lung-Sheng Yang, Tainan (TW);
Shih-Ming Chen, Tainan (TW);
Jiann-Fuh Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 225 days.

(21) Appl. No.: 12/929,772

(22) Filed: Feb. 15, 2011

(65) Prior Publication Data

US 2012/0113688 A1 May 10, 2012

(30) Foreign Application Priority Data

Nov. 5, 2010 (TW) ................................ 99138111 A (51) Int. Cl.
*H02M 3/335* (2006.01)
*H02M 7/00* (2006.01)
(52) U.S. Cl. .................... 363/20; 363/21.01; 363/21.12; 363/21.18; 363/21.17; 363/65; 363/71; 363/73; 363/131
(58) Field of Classification Search .................... 363/20, 363/21.01, 21.21, 21.17, 21.18, 65, 71, 73, 363/131
See application file for complete search history.

(56) References Cited

U.S. PATENT DOCUMENTS

| | | | | |
|---|---|---|---|---|
| 4,500,949 A | * | 2/1985 | Prete | 363/28 |
| 4,618,919 A | * | 10/1986 | Martin, Jr. | 363/21.12 |
| 5,057,986 A | * | 10/1991 | Henze et al. | 363/20 |
| 5,508,903 A | * | 4/1996 | Alexndrov | 363/16 |
| 5,694,304 A | * | 12/1997 | Telefus et al. | 363/21.03 |
| 5,712,772 A | * | 1/1998 | Telefus et al. | 363/21.02 |
| 5,796,595 A | * | 8/1998 | Cross | 363/71 |
| 6,744,647 B2 | * | 6/2004 | Cohen | 363/71 |
| 2009/0086514 A1 | * | 4/2009 | Fornage et al. | 363/21.17 |
| 2011/0249474 A1 | * | 10/2011 | Luo | 363/21.12 |

* cited by examiner

*Primary Examiner* — Bao Q Vu
(74) *Attorney, Agent, or Firm* — Bacon & Thomas, PLLC (57) ABSTRACT

An interleaved flyback converter device with leakage energy recycling includes: two flyback converters and an input power. Each flyback converter includes a capacitor, a switch, two diodes, and a transformer. The input power is connected to the capacitors of the two flyback converters respectively. By using the capacitors as input voltage, the two flyback converters are provided with lower voltage rating. The diodes are used to recycle leakage energy directly, and to clamp voltage on power components. Therefore, in addition to enhancing efficiency via recycling leakage energy, the two flyback converters have lower switching losses due to lower switching voltage.

10 Claims, 7 Drawing Sheets

INTERLEAVED FLYBACK CONVERTER DEVICE WITH LEAKAGE ENERGY RECYCLING

CROSS REFERENCE TO RELATED APPLICATION

This application claims the benefits of the Taiwan Patent Application Serial Number 099138111, filed on Nov. 5, 2010, the subject matter of which is incorporated herein by reference.

BACKGROUND OF THE INVENTION

1. Field of the Invention

The invention relates generally to an interleaved flyback converter device and, more particularly, to an interleaved flyback converter device with leakage energy recycling.

2. Description of Related Art

Generally, transformers are used for electrical isolation and voltage level adjustment. A flyback converter also has characteristic of electrical isolation, but its magnetic components are not mainly used for voltage level adjustment. Instead, the flyback converter makes use of coupled inductors to achieve the property of energy conversion. Therefore, it is particularly useful for energy storage and energy release. In addition to the features of low-cost and simple circuit layout, the flyback converter also has the advantage of easily achieving multiple outputs.

Figure 1:
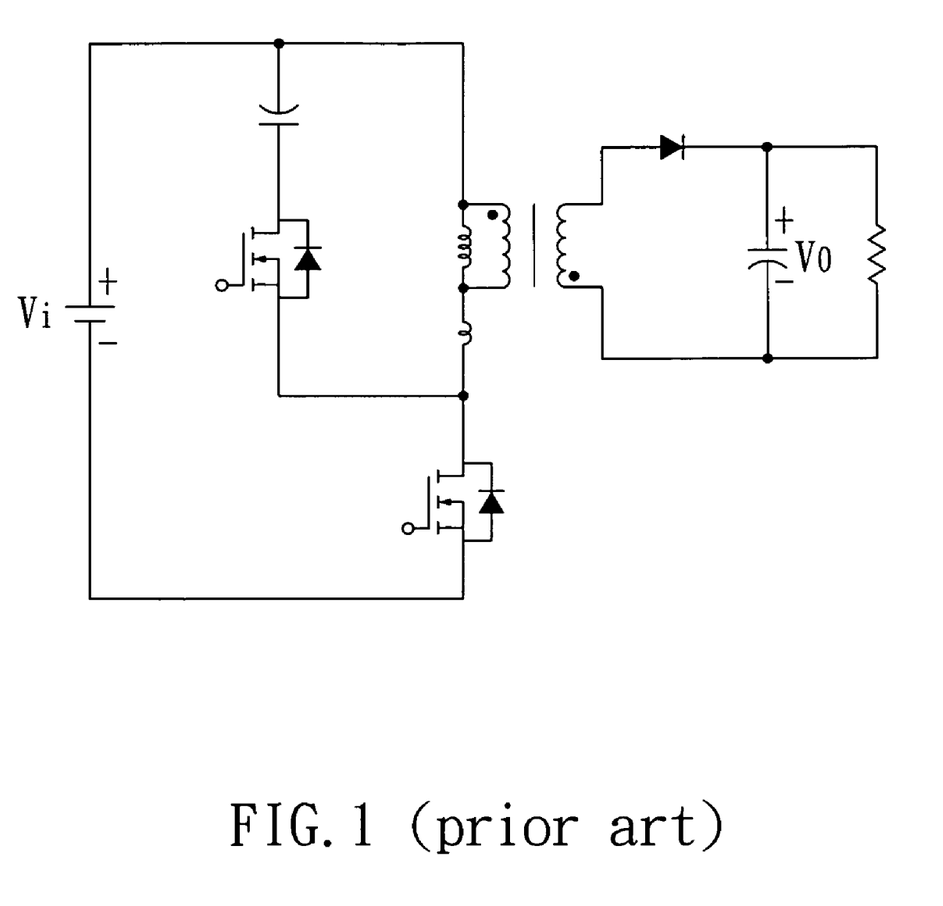
FIG. 1 schematically illustrates a first prior flyback converter.
Figure 2:
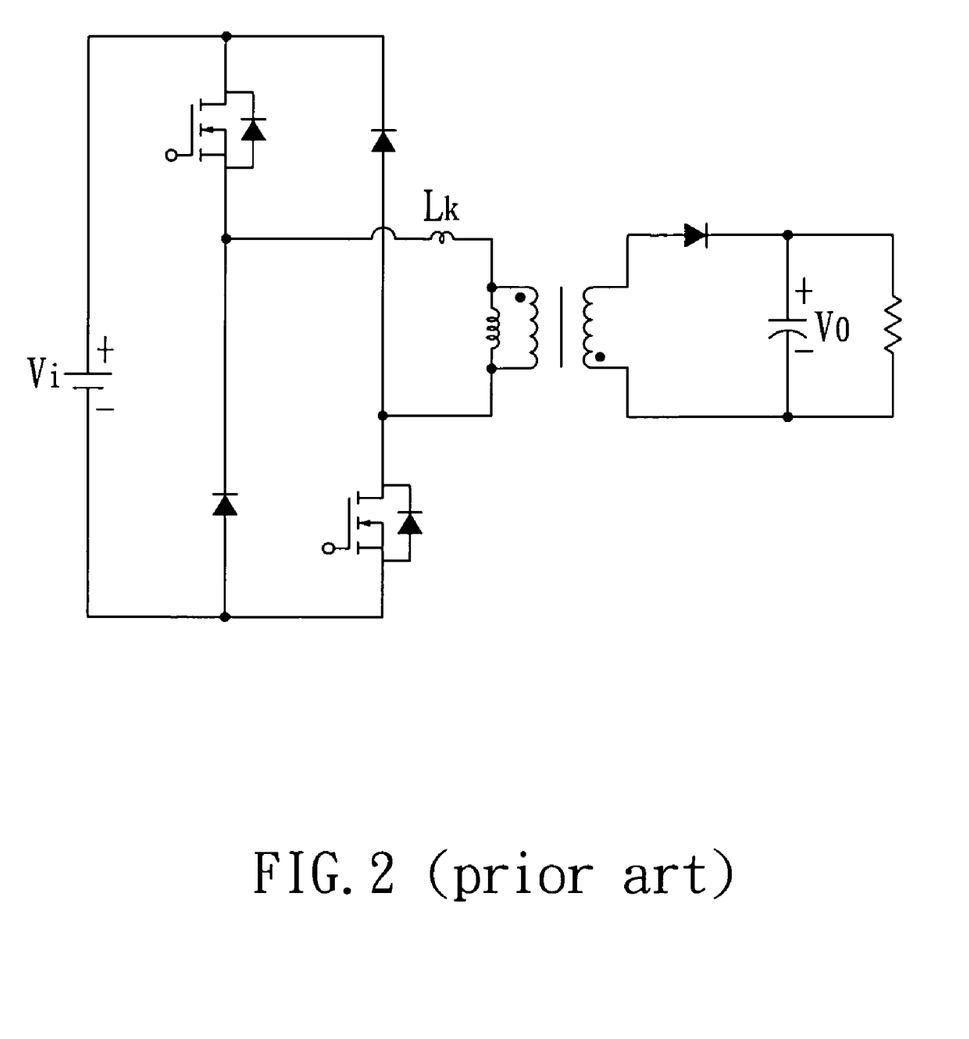
FIG. 2 schematically illustrates a second prior flyback converter.
Figure 3:
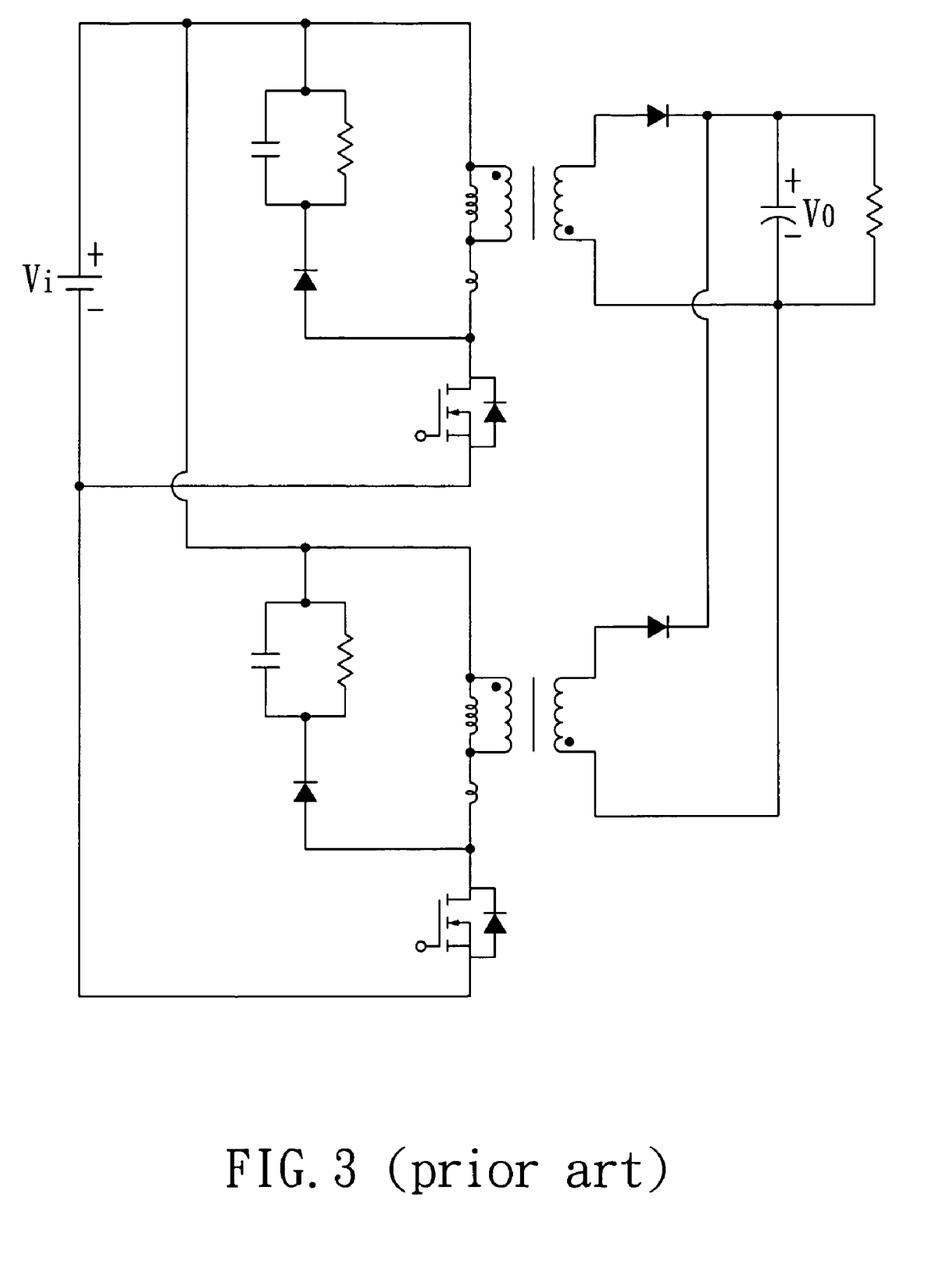
FIG. 3 schematically illustrates a third prior flyback converter.

With reference to FIG. 1, there is shown a prior flyback converter. In this circuit layout, it has advantages of having zero voltage switching, low electromagnetic interference and high efficiency etc.; however, the control thereof is complicated With reference to FIG. 2, there is shown another flyback converter in prior art. In this circuit layout, energy of leakage inductance Lk can be recycled effectively. The flyback converter can operate with high efficiency, and its circuit components can operate with low voltage rating. However, it has disadvantage of high-cost manufacturing, and thus is unfavorable to mass production in industry. With reference to FIG. 3, there is shown another flyback converter in prior art. In this circuit layout, output voltage Vo can have lower voltage fluctuation, and this circuit can be operated in high efficiency. However, this circuit layout is complicated, resulting in a disadvantage of high cost.

Therefore, it is desirable to design an interleaved flyback converter device with leakage energy recycling, which possesses the advantages of low voltage rating, low output voltage fluctuation, low cost and being applicable in high-power operation.

SUMMARY OF THE INVENTION

The object of the present invention is to provide an interleaved flyback converter device, which can recycle leakage energy efficiently and have the advantages of low cost and high efficiency.

To achieve this object, there is provided an interleaved flyback converter device with leakage energy recycling, which comprises: a first flyback converter including a first capacitor, a first switch, a first diode, a first transformer and a third diode; a second flyback converter including a second capacitor, a second switch, a second diode, a second transformer and a fourth diode; an input power connected to the first capacitor of the first flyback converter and the second capacitor of the second flyback converter; wherein the first transformer includes a primary winding having a first magnetizing inductance and a first leakage inductance; the second transformer includes a primary winding having a second magnetizing inductance and a second leakage inductance; the first switch, the primary winding of the first transformer, the primary winding of the second transformer and the second switch are connected in series; the first transformer and the second transformer are connected in parallel to a load.

The present invention uses divided voltage of the capacitors as input voltage, so that the two flyback converters can have lower voltage rating. In addition to recycling leakage inductance energy for increasing efficiency, the two flyback converters with lower withstand-voltage in the present invention are provided with lower switching loss.

DETAILED DESCRIPTION OF THE PREFERRED EMBODIMENT

Figure 4:
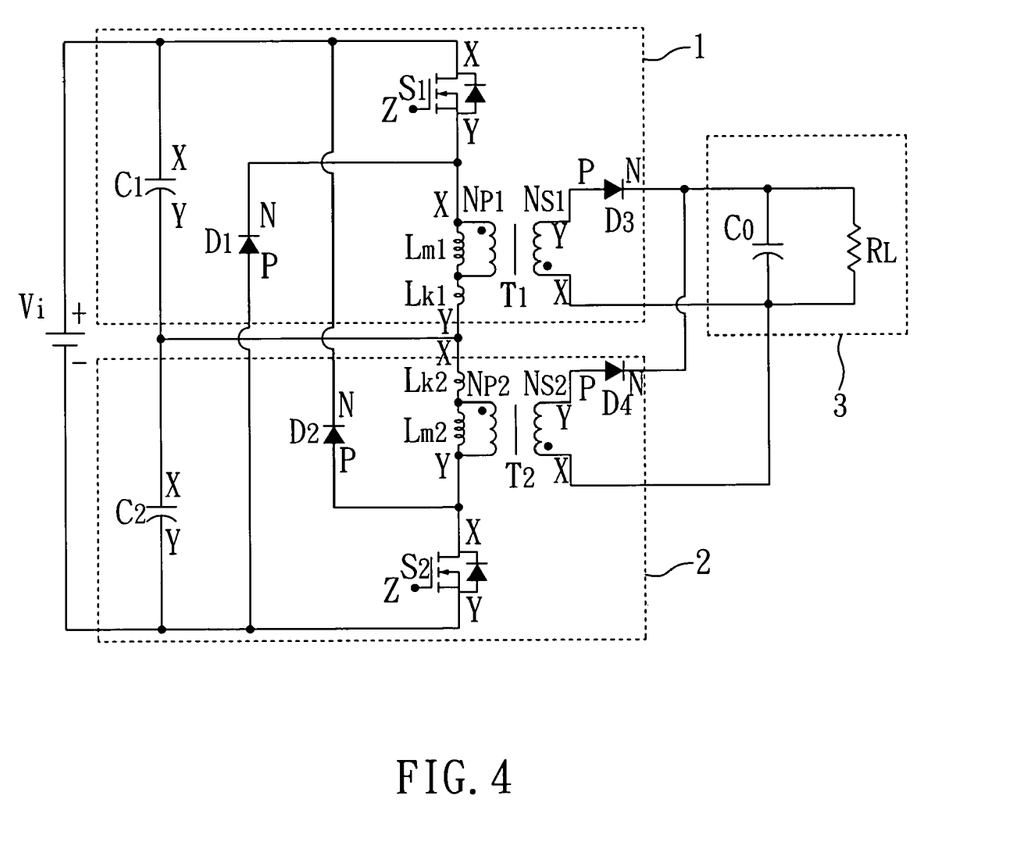
FIG. 4 shows a first circuit layout in accordance with one embodiment of the present invention.

With reference to FIG. 4, there is shown a first circuit layout with signal output voltage of the interleaved flyback converter device in accordance with one embodiment of the present invention. As shown, the interleaved flyback converter device with leakage energy recycling includes: a first flyback converter 1, a second flyback converter 2, and an input power Vi. The first flyback converter 1 and the second flyback converter 2 are connected in parallel to a load 3 (Co, $R_L$).

The first flyback converter 1 includes a first capacitor C1, a first switch S1, a first diode D1, a first transformer T1 and a third diode D3. The second flyback converter 2 includes a second capacitor C2, a second switch S2, a second diode D2, a second transformer T2 and a fourth diode D4. The input power Vi is connected to the first capacitor C1 of the first flyback converter 1, and the second capacitor C2 of the second flyback converter 2.

The first transformer T1 has a primary winding Np1 and a secondary winding Ns1, and the second transformer T2 has a primary winding Np2 and a secondary winding Ns2. The primary winding Np1 of the first transformer T1 has a first magnetizing inductance Lm1 and a first leakage inductance Lk1, and the primary winding Np2 of the second transformer T2 has a second magnetizing inductance Lm2 and a second leakage inductance Lk2. The first switch S1, the primary winding Np1 of the first transformer T1, the primary winding Np2 of the second transformer T2, and the second switch S2 are connected in series. The first transformer T1 and the second transformer T2 are connected in parallel to the load 3 (Co, $R_L$).

For the circuit connection of the interleaved flyback converter device with leakage energy recycling in accordance with the present invention, as shown in FIG. 4, a first terminal X of the first switch S1 is connected to a high voltage level of the input power Vi and a first terminal X of the first capacitor C1. A negative terminal N of the first diode D1 is connected to a second terminal Y of the first switch S1 and a first terminal X of the primary winding Np1 of the first transformer T1. A positive terminal P of the first diode D1 is connected to a low voltage level of the input power Vi and a second terminal Y of the second capacitor C2. A second terminal Y of the primary winding Np1 of the first transformer T1 is connected to a second terminal Y of the first capacitor C1, a first terminal X of the second capacitor C2 and a first terminal X of the primary winding Np2 of the second transformer T2. A second terminal Y of the secondary winding Ns1 of the first transformer T1 is connected to a positive terminal P of the third diode D3. A negative terminal N of the third diode D3 and the first terminal X of a secondary winding Ns1 of the first transformer T1 are connected to the load 3 (Co, $R_L$).

Further, a second terminal Y of the second switch S2 is connected to a low voltage level of the input power Vi and the second terminal Y of the second capacitor C2. A negative terminal N of the second diode D2 is connected to the first terminal X of the first switch S1 and the first terminal X of the first capacitor C1. A positive terminal P of the second diode D2 is connected to a second terminal Y of the primary winding Np2 of the second transformer T2 and a first terminal X of the second switch S2. The first terminal X of the primary winding Np2 of the second transformer T2 is connected to the second terminal Y of the first capacitor C1, the first terminal X of the second capacitor C2 and the second terminal Y of the primary winding Np1 of the first transformer T1. A second terminal Y of the secondary winding Ns2 of the second transformer T2 is connected to a positive terminal P of the fourth diode D4. A negative terminal N of the fourth diode D4 and a first terminal X of the secondary winding Ns2 of the second transformer T2 are connected to the load 3 (Co, $R_L$).

In this embodiment, the first switch S1 and the primary winding Np1 of the first transformer T1 are connected in series, and voltage on the first capacitor C1 is half of that of the input power Vi. The second switch S2 and the primary winding Np2 of the second transformer T2 are connected in series, and voltage on the second capacitor C2 is half of that of the input power Vi.

With reference to FIG. 4, a third terminal Z of the first switch S1 is employed to receive a first control signal so as to control the first switch S1 to be on and off, and a third terminal Z of the second switch S2 is employed to receive a second control signal so as to control the second switch S2 to be on and off. The first control signal and the second control signal are interleaved, i.e., having a phase difference of 180 degrees. When the first switch S1 is switched on by the first control signal, the first capacitor C1 charges the first magnetizing inductance Lm1 and the first leakage inductance Lk1. When the first switch S1 is switched on by the first control signal, the first capacitor C1 charges the second capacitor C2 via the first magnetizing inductance Lm1 and the first leakage inductance Lk1. The charging path is that: the first leakage inductance Lk1→the second capacitor C2→the first magnetizing inductance Lm1. Further, when the second switch S2 is switched on by the second control signal, the second capacitor C2 charges the second magnetizing inductance Lm2 and the second leakage inductance Lk2. When the second switch S2 is switched on by the second control signal, the second capacitor C2 charges the first capacitor C1 via the second magnetizing inductance Lm2 and the second leakage inductance Lk2. The charging path is that: the second leakage inductance Lk2→the second magnetizing inductance Lm2→the first capacitor C1.

The present invention uses divided voltage of the first capacitor C1 and the second capacitor C2 as input voltage, so that the first flyback converter 1 and the second flyback converter 2 are provided with a lower voltage rating. The diodes D1, D2 are used to recycle leakage inductance energy directly, and to clamp voltage of power devices. Therefore, in addition to recycling leakage inductance energy for increasing efficiency, the first and second flyback converters 1, 2 of the invention are both provided with lower withstand-voltage so as to have lower switching loss. The voltage-clamp of the power devices also lowers the voltage rating specification of the power devices. Besides, the first and second flyback converters 1, 2 can be used without snubber circuit, resulting in a better cost advantage.

Figure 5:
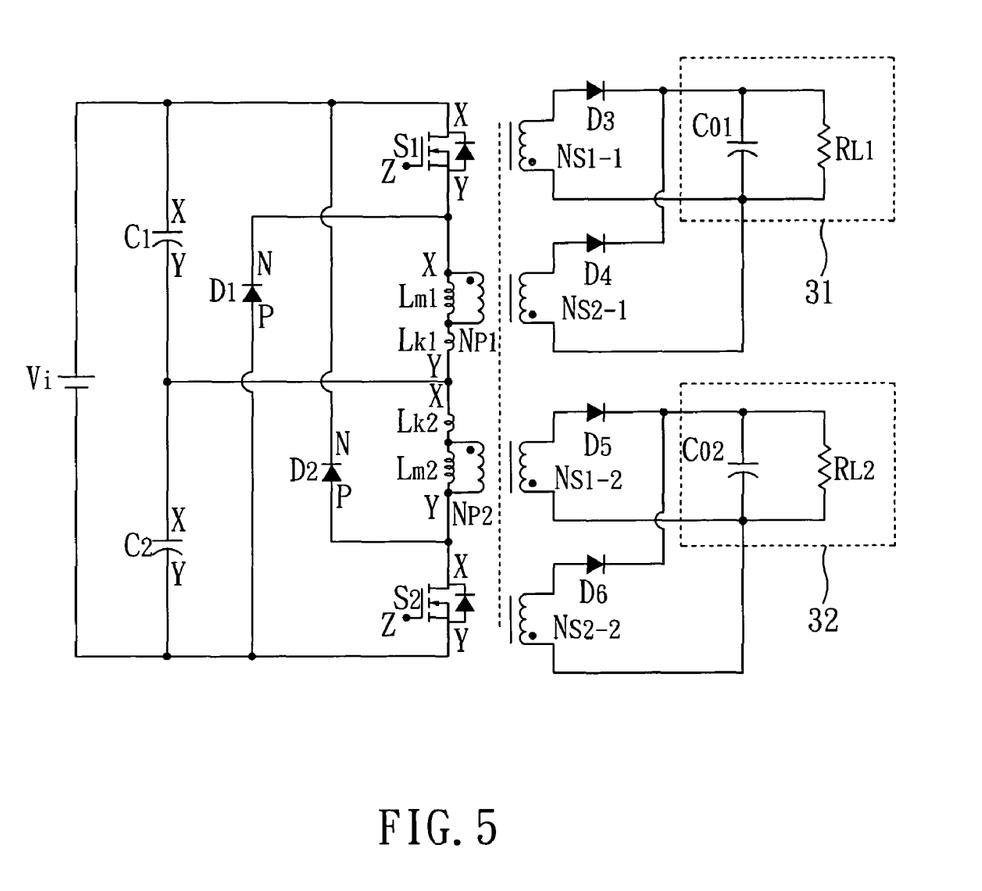
FIG. 5 shows a second circuit layout in accordance with one embodiment of the present invention.

With reference to FIG. 5, there is shown a second circuit layout with two output voltages of the interleaved flyback converter device in accordance with one embodiment of the present invention. As shown, the secondary winding Ns1 of the first transformer T1 can be divided into two secondary windings Ns1-1 and Ns1-2, and the secondary winding Ns2 of the second transformer T2 can be divided into two secondary windings Ns2-1 and Ns2-2. The secondary winding Ns1-1 of the first transformer T1 and the secondary winding Ns2-1 of the second transformer T2 are connected in parallel to a first load 31 (Co1, $R_{L1}$) via the third diode D3 and the fourth diode D4. The secondary winding Ns1-2 of the first transformer T1 and the secondary winding Ns2-2 of the second transformer T2 are connected in parallel to a second load 32 (Co2, $R_{L2}$) via the fifth diode D5 and the sixth diode D6. Accordingly, the interleaved flyback converter device with leakage energy recycling in accordance with the present invention can have two output voltages. However, the number of extended output voltages is not limited in two; it can be extended to three, four or more output voltages.

Figure 6:
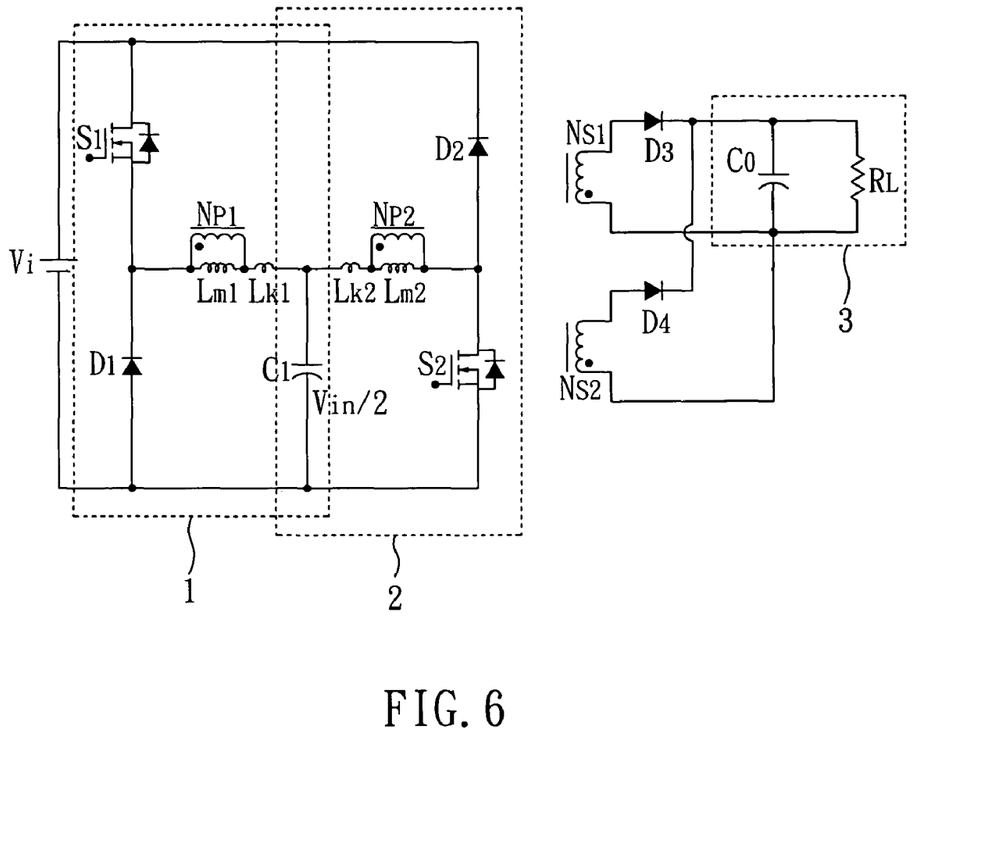
FIG. 6 shows a first circuit layout in accordance with another embodiment of the present invention.
Figure 7:
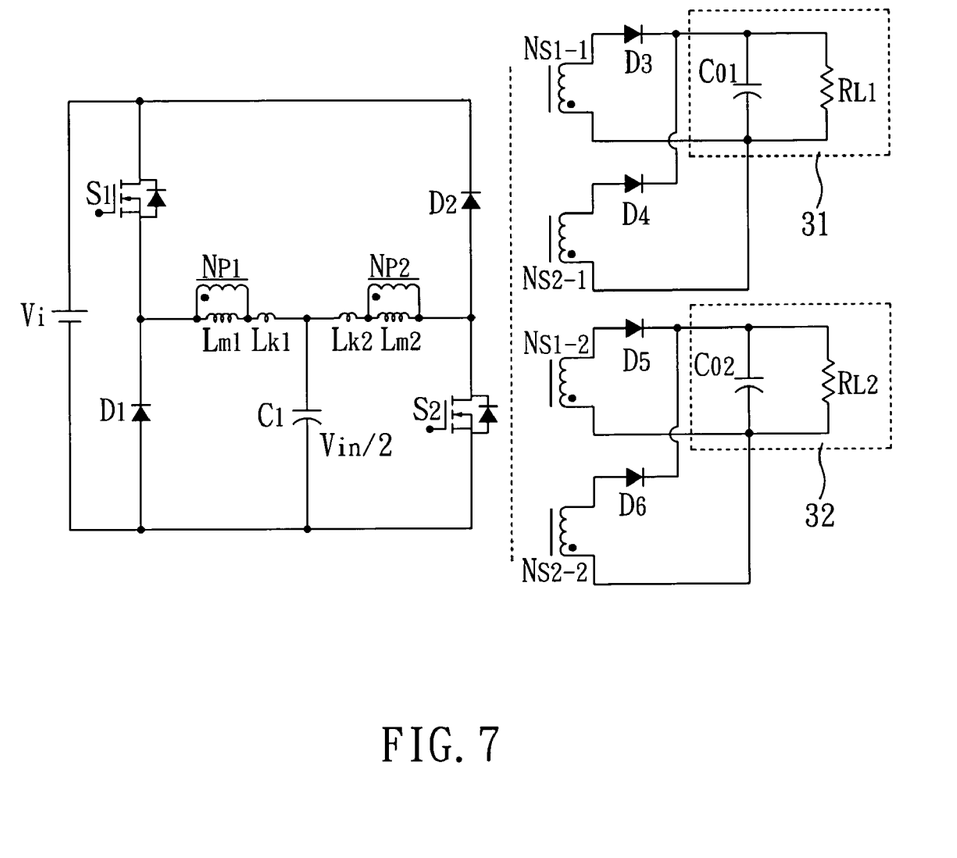
FIG. 7 shows a second circuit layout in accordance with another embodiment of the present invention.

Furthermore, with reference to FIG. 6, there is shown a first circuit layout in accordance with another embodiment of the present invention. This circuit layout is obtained by simplifying that of FIG. 4. That is, without the arrangement of the second capacitor C2 of FIG. 4, the circuit layout of FIG. 6 still makes use of similar operation to configure the first flyback converter 1 and the second flyback converter 2 for achieving effect of recycling energy. Similarly, the circuit in FIG. 6 can be applied to single output voltage. It can also be extended to two output voltages as shown in FIG. 7. However, the number of extended output voltages is not limited in two; it can be extended to three, four or more output voltages.

Although the present invention has been explained in relation to its preferred embodiment, it is to be understood that many other possible modifications and variations can be made without departing from the spirit and scope of the invention as hereinafter claimed.

What is claimed is:

1. An interleaved flyback converter device with leakage energy recycling, comprising:
    a first flyback converter including a first capacitor, a first switch, a first diode, a first transformer and a third diode;
    a second flyback converter including a second capacitor, a second switch, a second diode, a second transformer and a fourth diode;
    an input power connected to the first capacitor of the first flyback converter and the second capacitor of the second flyback converter;
    wherein the first transformer includes a primary winding having a first magnetizing inductance and a first leakage inductance; the second transformer includes a primary winding having a second magnetizing inductance and a second leakage inductance; the first switch, the primary winding of the first transformer, the primary winding of the second transformer and the second switch are connected in series; the first transformer and the second transformer are connected in parallel to a load.

2. The interleaved flyback converter device with leakage energy recycling as claimed in claim 1, wherein a first terminal of the first switch is connected to a high voltage level of the input power and a first terminal of the first capacitor; a negative terminal of the first diode is connected to a second terminal of the first switch and a first terminal of the primary winding of the first transformer; a positive terminal of the first diode is connected to a low voltage level of the input power and a second terminal of the second capacitor; a second terminal of the primary winding of the first transformer is connected to a second terminal of the first capacitor, a first terminal of the second capacitor and a first terminal of the primary winding of the second transformer; a second terminal of the secondary winding of the first transformer is connected to a positive terminal of the third diode; a negative terminal of the third diode and the first terminal of a secondary winding of the first transformer are connected to the load.

3. The interleaved flyback converter device with leakage energy recycling as claimed in claim 1, wherein a second terminal of the second switch is connected to a low voltage level of the input power and the second terminal of the second capacitor; a negative terminal of the second diode is connected to the first terminal of the first switch and the first terminal of the first capacitor; a positive terminal of the second diode is connected to a second terminal of the primary winding of the second transformer and a first terminal of the second switch; the first terminal of the primary winding of the second transformer is connected to the second terminal of the first capacitor, the first terminal of the second capacitor and the second terminal of the primary winding of the first transformer; a second terminal of the secondary winding of the second transformer is connected to a positive terminal of the fourth diode; a negative terminal of the fourth diode and a first terminal of the secondary winding of the second transformer are connected to the load.

4. The interleaved flyback converter device with leakage energy recycling as claimed in claim 3, wherein the first switch and the primary winding of the first transformer are connected in series, and voltage on the first capacitor is half of that of the input power.

5. The interleaved flyback converter device with leakage energy recycling as claimed in claim 4, wherein the second switch and the primary winding of the second transformer are connected in series, and voltage on the second capacitor is half of that of the input power.

6. The interleaved flyback converter device with leakage energy recycling as claimed in claim 5, wherein a third terminal of the first switch receives a first control signal so as to control the first switch to be on and off, and a third terminal of the second switch receives a second control signal so as to control the second switch to be on and off, the first control signal and the second control signal being interleaved.

7. The interleaved flyback converter device with leakage energy recycling as claimed in claim 6, wherein current of the first magnetizing inductance flowing through the primary winding of the first transformer is equal to current of the first leakage inductance when the first switch is switched on by the first control signal.

8. The interleaved flyback converter device with leakage energy recycling as claimed in claim 7, wherein the first leakage inductance charges the second capacitor when the first switch is switched on by the first control signal.

9. The interleaved flyback converter device with leakage energy recycling as claimed in claim 8, wherein current of the second magnetizing inductance flowing through the primary winding of the second transformer is equal to current of the second leakage inductance when the second switch is switched on by the second control signal.

10. The interleaved flyback converter device with leakage energy recycling as claimed in claim 9, wherein the second leakage inductance charges the first capacitor when the second switch is switched on by the second control signal.

* * * * *